(12) United States Patent
Xie

(10) Patent No.: US 9,268,772 B2
(45) Date of Patent: Feb. 23, 2016

(54) DOCUMENT COLLABORATING METHOD AMONG MULTIPLE USERS

(71) Applicant: Yong Xie, Shaanxi (CN)

(72) Inventor: Yong Xie, Shaanxi (CN)

(*) Notice: Subject to any disclaimer, the term of this patent is extended or adjusted under 35 U.S.C. 154(b) by 239 days.

(21) Appl. No.: 13/729,027

(22) Filed: Dec. 28, 2012

(65) Prior Publication Data

US 2013/0173532 A1      Jul. 4, 2013

(30) Foreign Application Priority Data

Dec. 28, 2011   (CN) .......................... 2011 1 0444825

(51) Int. Cl.
  *G06F 17/24*   (2006.01)
  *G06F 17/30*   (2006.01)
  *G06Q 10/10*   (2012.01)

(52) U.S. Cl.
  CPC ........ *G06F 17/30011* (2013.01); *G06Q 10/101* (2013.01)

(58) Field of Classification Search
  CPC .................. G06F 17/30011; G06Q 10/101
  See application file for complete search history.

(56) References Cited

U.S. PATENT DOCUMENTS

| | | | |
|---|---|---|---|
| 7,840,543 B2* | 11/2010 | Guiheneuf et al. ........... | 707/695 |
| 2004/0010621 A1* | 1/2004 | Afergan et al. ............... | 709/247 |
| 2010/0299060 A1* | 11/2010 | Snavely et al. ............... | 701/201 |
| 2011/0078246 A1* | 3/2011 | Dittmer-Roche ............. | 709/205 |
| 2011/0296291 A1* | 12/2011 | Melkinov et al. ............. | 715/229 |
| 2012/0089659 A1* | 4/2012 | Halevi et al. ................. | 709/201 |
| 2012/0136936 A1* | 5/2012 | Quintuna ...................... | 709/204 |
| 2012/0143917 A1* | 6/2012 | Prabaker et al. ............. | 707/784 |
| 2012/0331061 A1* | 12/2012 | Lininger ....................... | 709/205 |

* cited by examiner

*Primary Examiner* — Tarek Chbouki
(74) *Attorney, Agent, or Firm* — Zhengui Yao; Meihua Patent Services LLC

(57) ABSTRACT

A document collaborating method among multiple users automatically notifies related users once a setting of sharing is finished and regularly reminds the related users according to a sharing time limit. In the document collaborating method, one or more types of message accounts correspondent to a username of each user is created; a document initial version number is allocated for one or more documents which the user shares with contacts of the user or a collaborative group of the user, and a correspondent sharing permission and a correspondent sharing time limit are set; thereafter, notification messages are sent to the contacts of the user or the collaborative group of the user by the message account, and the message accounts of all sharing users of the shared document regularly reminds the sharing users to notice the time limit according to the sharing time limit.

18 Claims, 1 Drawing Sheet

--- for each user creating one or more types of message accounts correspondent to a username of the user, wherein each user is able to establish contacts and a collaborative group thereof allocating a document initial version number for one or more documents which the user shares with the contacts or the collaborative group, saving an initial version of the shared document and then setting a correspondent sharing permission and a correspondent sharing time limit after finishing setting the sharing permission and the sharing time limit, automatically sending notification messages to the correspondent contacts or the correspondent collaborative group for readily notifying by the message accout; and regularly reminding the sharing users to notice the time limit according to the sharing time limit by the message accounts of all sharing users of the shared document when the shared document is in a document collaborating mode, locking content being edited for each sharing user; when the locked content is being edited, regularly and automatically saving content being locked for each sharing user and allowing each sharing user to manually save the document; and automatically creating an updated version of the document under the user if the automatically saving or the manually saving by the user is finished automatically unlocking the locked content once editing the locked content is finished when a last user in the document collaborating mode goes offline, saving a last document of the last user as a latest version of the last user and then creating a new version of the document with the latest version of the last user and other latest versions of other sharing users of the document

DOCUMENT COLLABORATING METHOD AMONG MULTIPLE USERS

BACKGROUND OF THE PRESENT INVENTION

1. Field of Invention

The present invention relates to document processing, and more particularly to a document collaborating method among multiple users.

2. Description of Related Arts

Along with the popularity and the development of computers and networks, demand of editing or maintaining documents via multiple users' collaboration is increased. However, conventional arts, such as the Microsoft's online version of Office, have problems of simple function and inconvenient using. The problems put many restrictions upon jointedly editing and maintaining documents by multiple offline and online users, which is inconvenient for document collaboration. Conventionally, it is still more common for the users to share files through a function of sending file of traditional mails and instant messengers. A lack of a technical solution for easily offline and online communicating and accomplishing document collaboration makes it difficult to balance between multiple document processing functions and a convenient and efficient collaborating function.

SUMMARY OF THE PRESENT INVENTION

An object of the present invention is to solve the above technical problems and provide a document collaborating method among multiple users. The document collaborating method comprises following steps of:

(a) for each user creating one or more types of message accounts correspondent to a username of the user, wherein each user is able to establish contacts or a collaborative group thereof;

(b) allocating a document initial version number to one or more documents which the user shares with the contacts or the collaborative group, saving an initial version of the document and then setting correspondent sharing permission and sharing time limit; and (c) after finishing setting the sharing permission and the sharing time limit, automatically sending notification messages to the correspondent contacts or the correspondent collaborative group for readily notifying by the message account, and regularly reminding the sharing users to notice the time limit according to the sharing time limit by the message accounts of all sharing users of the shared document.

Preferably, after the step (c), the document collaborating method further comprises following steps of:

(d) when the shared document is in a document collaborating mode, locking content being edited for each sharing user; when the locked content is being edited, regularly and automatically saving content being locked for each sharing user and allowing each sharing user to manually save the document; and automatically creating an updated version of the document under the user if the automatically saving or the manually saving by the user is finished;

(e) automatically unlocking the locked content once editing the locked content is finished; and (f) when a last user in the document collaborating mode goes offline, saving a last document of the last user as a latest version of the last user and then creating a new version of the document with the latest version of the last user and other latest versions of other sharing users of the document.

Preferably, the type of the message account is one member selected from a group consisting of an intranet mail account, an intranet instant messenger account, an intra-site short message account, a bound internet mail account, a bound internet instant messenger account, and a bound phone number able to receive short messages or multimedia messages.

These and other objectives, features, and advantages of the present invention will become apparent from the following detailed description, the accompanying drawings, and the appended claims.

DETAILED DESCRIPTION OF THE PREFERRED EMBODIMENT

Combined with the preferred embodiments, further illustration about the present invention is following for one skilled in the art to understand the present invention.

Figure 1:
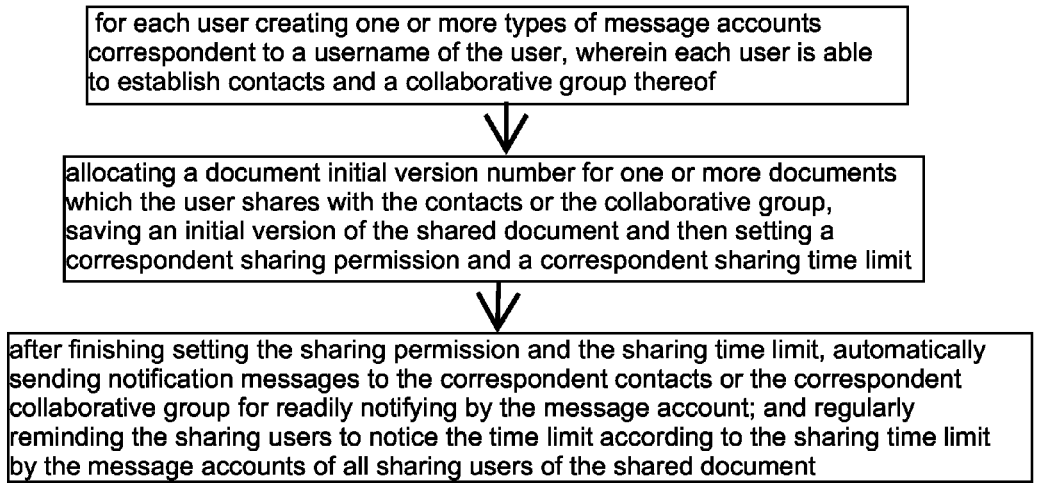
FIG. 1 is a flow chart of a document collaborating method among multiple users according to a first preferred embodiment of the present invention.

According to a first preferred embodiment of the present invention, referring to FIG. 1, a document collaborating method among multiple users comprises following steps of:

(a) for each user creating one or more types of message accounts correspondent to a username of the user, wherein each user is able to establish contacts or a collaborative group thereof;

(b) allocating a document initial version number to one or more documents which the user shares with the contacts or the collaborative group, saving an initial version of the document and then setting correspondent sharing permission and sharing time limit; and (c) after finishing setting the sharing permission and the sharing time limit, automatically sending notification messages to the correspondent contacts or the correspondent collaborative group for readily notifying by the message account, and regularly reminding the sharing users to notice the time limit according to the sharing time limit by the message accounts of all sharing users of the shared document.

One skilled in the art will understand that the message accounts are accounts able to provide messages. Content of the messages depends on what information the messages aim to send to related users. The documents usually equal files. For example, a directory of MY DOCUMENTS in Windows system comprises directories of MY PICTURES, MY MUSIC and MY VIDEO. The documents are not only subject to text documents; according to prior arts, the documents further comprise static pictures, dynamic pictures, audio documents and multimedia documents.

According to the first preferred embodiment of the present invention, the step (a) of "for each user creating one or more types of message accounts correspondent to a username of the user, wherein each user is able to establish contacts or collaborative group thereof", means that, after the username of the user is created, the document collaborating method readily creates one or more types of the message accounts correspondent to the username without any manual setting of the user for each user and gives the user permission to establish the contacts and the collaborative group according to practical needs. As is known to the one skilled in the art, commonly, the contacts belong to a concept of individuals, while the collaborative group belongs to a concept of groups or sets. Commonly, multiple contacts can be arranged into a single collaborative group according to users' needs; or, certainly, contacts which are intended to be arranged into a single collaborative group can be directly added therein. Apparently, the step (a) equals an initialization step of the document collaborating method and aims at document collaborating thereafter and interconnecting or interacting among the message accounts.

According to the first preferred embodiment of the present invention, the step (b) of "allocating a document initial version number to one or more documents which the user shares with the contacts or the collaborative group, saving an initial version of the document and then setting correspondent sharing permission and sharing time limit", means that, after the step (a) is executed, the one or more documents shared to the contacts or the collaborative group obtain the allocated document initial version number and the correspondent initial version of the document; and that the correspondent sharing permission and the correspondent sharing time limit are set when sharing the document. As is known to the one skilled in the art, the version number is widely applied in document management; the sharing permission of the document comprises normal occasions, such as read-only, being printable, being nonprintable, annotate-only, review-only, read-and-write and complete control; and the sharing time limit, namely, defines a lifecycle of sharing the document.

According to the first preferred embodiment of the present invention, the step (c) of "after finishing setting the sharing permission and the sharing time limit, automatically sending notification messages to the correspondent contacts or the correspondent collaborative group for readily notifying by the message account, and regularly reminding the sharing users to notice the time limit according to the sharing time limit by the message accounts of all sharing users of the shared document", means that, once the sharing permission and the sharing time limit are set, the message accounts embody a feature of the document collaborating method that a potential information asymmetry generated by sharing the documents between an initiator and the multiple users is possibly avoided, as a result of the one or more types of the message accounts which automatically send notification messages to the correspondent contacts or the correspondent collaborative group for readily notifying. Obviously, herein the automatically notifying comprises sending notification messages to related contacts or related collaborative group thereof and also to the sharing initiator by the message account of the sharing initiator. Further, the document collaborating method comprises regularly reminding the sharing users to notice the time limit according to the sharing time limit by the message accounts of all sharing users of the shared document. It is easy for the one skilled in the art to understand that the document collaborating method necessarily comprises counting down and regularly notifying the sharing time limit in the embodiment of the present invention. The regularly reminding means that each message account only notifies the user of the message account, rather than other related users, so as to not only avoid occupying networks but also notify each sharing user because the regularly reminding only notifies the local users from local computers. In fact, both the automatically notifying and the regularly reminding in certain conditions are automatic trigger mechanisms in essence. According to prior arts, many kinds of automatic trigger mechanisms and notifying mechanisms have been disclosed. Since a purpose of the present invention is not to provide any new automatic trigger mechanism or new notifying mechanism, the automatic trigger mechanisms and the notifying mechanisms are illustrated in the prior arts without repeating herein.

Thus the first preferred embodiment of the present invention provides a complete and clear technical solution about the document collaborating method which is technically improved compared to the prior arts about the message account and to online Office technologies like Microsoft's and introduces a mechanism that the automatically notifying and the regularly reminding to the related users according to the shared time limit are readily triggered once the settings about sharing are finished, which is similar to a reminder mechanism, so as to form the present technical solution and overcome a low collaboration efficiency and simple function during the conventional document collaborating. Certainly, an introduction of the collaborative group enriches technical effects of the first preferred embodiment and the conventional concept of QQ groups and Microsoft Service Network (MSN) groups and various forums which send messages to groups of different permissions, such as an ordinary user group and a user group with senior permission, are liable to be taken as reference to realize the collaborative group. Since the purpose of the present invention is not to provide any new group mechanism, the group mechanism is as illustrated in the prior arts without repeating herein.

Figure 2:
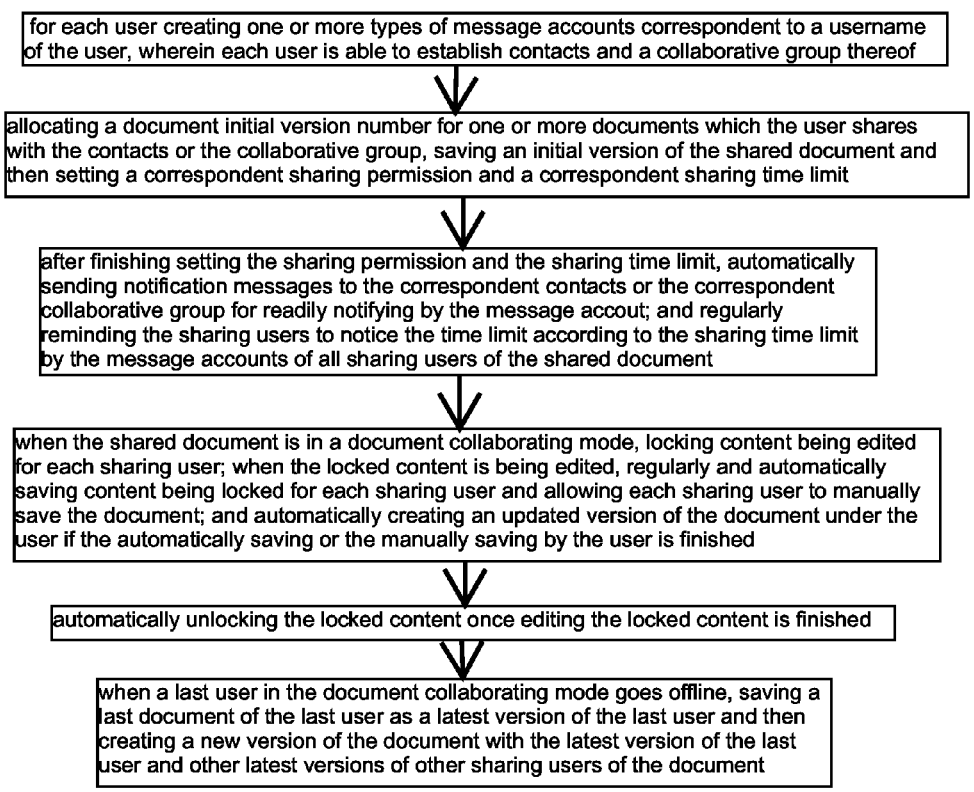
FIG. 2 is a flow chart of the document collaborating method among multiple users according to a second preferred embodiment of the present invention.

According to a second preferred embodiment of the present invention, referring to FIG. 2, in order to avoid possible confusion about document versions caused by multiple editing behaviors during the document collaborating, the document collaborating method further comprises following steps of:

(d) when the shared document is in a document collaborating mode, locking content being edited for each sharing user; when the locked content is being edited, regularly and automatically saving content being locked for each sharing user and allowing each sharing user to manually save the document; and automatically creating an updated version of the document under the user if the automatically saving or the manually saving by the user is finished;

(e) automatically unlocking the locked content once editing the locked content is finished; and (f) when a last user in the document collaborating mode goes offline, saving a last document of the last user as a latest version of the last user and then creating a new version of the document with the latest version of the last user and other latest versions of other sharing users of the document.

According to the second preferred embodiment of the present invention, the step (d) of "when the shared document is in a document collaborating mode, locking content being edited for each sharing user; when the locked content is being edited, regularly and automatically saving content being locked for each sharing user and allowing each sharing user to manually save the document; and automatically creating an updated version of the document under the user if the automatically saving or the manually saving by the user is finished", means that the content being edited of each sharing user is effectively protected by the step of locking content being edited for each sharing user and the updated version of the document under the user is created by the step of saving as a contrast to the first preferred embodiment, so as to at least ensure that each sharing user corresponds to a document version with respective personal editing features.

Then the step (e) of "automatically unlocking the locked content once editing the locked content is finished" indicates that the locked content is automatically unlocked as long as an occasion that editing the locked content is finished exists, so as to release the locked content timely and effectively and facilitate further editing the released content by other users.

According to the second preferred embodiment of the present invention, the final step (f) "when a last user in the document collaborating mode goes offline, saving a last document of the last user as a latest version of the last user and then creating a new version of the document with the latest version of the last user and other latest versions of other sharing users of the document", has different emphases from the step (d). The step (d) at least ensures that each sharing user corresponds to the document version with respective personal editing features, while the step (f) integrates the latest version of the last user going offline, i.e., the last user logging out or the last user exiting, with the other latest versions of the other users to create the new version of the shared document. Obviously, the new version has the editing features of each sharing user and is possibly a version that the document collaborating needs most.

According to a third preferred embodiment which is exemplary only and not intended to be limiting, the type of the message account is selected from a group consisting of an intranet mail account, an intranet instant messenger account, an intra-site short message account, a bound internet mail account, a bound internet instant messenger account, and a bound phone number able to receive short messages or multimedia messages. All the above different types of the message accounts play a role of sending messages and other information except the messages in the prior arts. The above different types of the message accounts indicate that the message account of the present invention is supported according to the specification of the present invention and the prior arts. The message account of the present invention obviously is free from inappropriate summarization.

The intranet mail account, commonly applied within enterprises and governments, or the mail account in networks within industries provides no access to internet users and is unable to receive internet mails.

Feiq and Tencent Real Time eXchange (RTX) are the common intranet instant messenger accounts, wherein Feiq communicates information without depending on servers while Tencent RTX depends on deployment on servers.

The intra-site short message account develops along with the forum and bulletin board system BBS within the internet or the intranet. The intra-site short message account is usually only subject to communication within the forums or the BBS without external connection.

The internet mail account refers to the mail account based on the internet, rather than the intranet. Usually via a connection to the internet, the internet mail account is able to send information like the mail to other internet mail accounts.

The common internet instant messenger accounts comprise ICQ accounts, MSN accounts, YAHOO Messenger accounts and QQ accounts.

The phone number able to receive the short messages or the multimedia messages necessitates the online phone number, or it is impossible to satisfy a qualification of being able to receive the short messages or the multimedia messages. In normal conditions, the phone has to keep staying online, but terminals which are not limited to phones appear under development of communication technology and also support receiving the short messages or the multimedia messages, such as tablet computers. However, whatever kind of the terminal, the terminal is always required to have a unique number to be accessible to a communication network.

Apparently, the third preferred embodiment emphasizes on specific options about the message accounts compared to the first preferred embodiment and the second preferred embodiment of the present invention. Generally speaking, the intranet message accounts certainly come from the intranet and can be realized through relatively simple technologies which are various according to the prior arts; while the internet message accounts are connected via binding. The one skilled in the art understands that multiple binding manners and applications exist in the prior arts. For example, an intranet computer has limited access to the internet or an intranet printer via an intranet proxy server or a printer server; after finishing a user operation of spending, transferring, or remitting, a bank sends notification messages to a designated phone number of the user, or automatically and regularly sends detailed bills to a designated internet mail account of the user which is out of a bank private network for notifying the user, via connecting the bank private network to servers of a short message service provider or a mail service provider. Other binding manners comprise that in order to simplify user registration procedures a forum is bound with widely used twitter accounts, blog accounts, or the instant messenger accounts, in such a manner that users are able to log in the forum by using the twitter accounts, the blog accounts or the instant messenger accounts which the users already have without registration in the forum. Since the purpose of the present invention is not to provide any new binding manner, the binding manner is as illustrated in the prior arts without repeating herein.

According to a fourth preferred embodiment which is exemplary only and not intended to be limiting, when the document content is presented to the user, an element of the document content comprises positioning information, in such a manner that it is very easy for the user to build a bookmark of the element when the element is chosen by the user. The one skilled in the art understand that the element of the document content usually comprises characters, words, lines, sentences, paragraphs, pages, sections, chapters and inserted formulas or inserted multimedia content in cells or the document. The positioning information of the element can be only pointing at a specific line or a specific paragraph, pointing at a specific row of a specific line or a specific line of a specific paragraph, or pointing at a specific paragraph of a specific page or a specific section of a specific chapter. It is easy to understand that the bookmark of the chosen element can be built via the positioning information for a convenience of document jumping or reading when the positioning information is comprised. Essentially speaking, a jumping directory, a jumping index and the bookmark all belong to the positioning information, wherein a key is to depend on what standard to build the positioning information.

According to a fifth preferred embodiment which is exemplary only and not intended to be limiting, the notification messages mentioned above comprise an access address of the shared document and illustrations of the sharing permission and the sharing time limit. Obviously, the fifth preferred embodiment aims at detailing composition of the notification messages.

According to a sixth preferred embodiment which is exemplary only and not intended to be limiting, when the shared document is in the document collaborating mode, the document collaborating method further comprises displaying warning information which indicates that locking the being edited content is done by a specific user. Obviously, the sixth preferred embodiment aims at reminding each user via the warning information and indicating an identity of the user who locks the content, which is beneficial to further strengthening collaboration among each user thereafter.

According to a seventh preferred embodiment which is exemplary only and not intended to be limiting, the locked content is embodied as a line or a cell which is currently edited or an inserted formula or an inserted multimedia content in the document. Obviously, the seventh preferred embodiment aims at structuring the document and defining each editable element after structuring. Apparently, the structuring in forms of lines and cells is only an implementation manner and aims at improving the efficiency of document collaborating. The one skilled in the art is completely free to use other structuring manners for facilitating the document collaborating among multiple users.

According to an eighth preferred embodiment which is exemplary only and not intended to be limiting, when the shared document is in the document collaborating mode, the document collaborating method further comprises highlighting or circling the locked content. Obviously, the eighth preferred embodiment aims at noticeably displaying the locked content.

According to a ninth preferred embodiment which is exemplary only and not intended to be limiting, the new version of the shared document is prevented from covering previous versions before the new version; and the updated version of the shared document is also prevented from covering previously updated versions. Obviously, the ninth preferred embodiment aims at possibly avoiding loss caused by too many versions and mistaken operations.

According to a tenth preferred embodiment which is exemplary only and not intended to be limiting, the collaborative group comprises the user and other invited users designated by the user. Obviously, according to the tenth preferred embodiment, members of the collaborative group are detailed and the other users can be invited, which means that the contacts of the user can be invited and users out of the contacts of the user can also be invited, so as to overcome a technical disadvantage that the collaborative group of the user is only able to add the contacts of the user and thus simplify procedures of maintaining the collaborative group.

According to an eleventh preferred embodiment which is exemplary only and not intended to be limiting, the user is embodied as a mother user and one or more sub-users are created for the mother user; a document list of the sub-user comprises documents or folders which are designated by the mother user; and the mother user sets an access permission, an access password or an access time limit of the designated document or the designated folder. Obviously, the eleventh preferred embodiment aims at improving repeatedly accessible capacity of existing documents and possibly reducing occupancy of networks and database. Essentially speaking, creating the sub-users is similar to creating new users except an important difference that creating the sub-users is done by the mother user and it is unnecessary for the mother user to distributing the documents or the folders, since the mother user can designate accessible documents or folders for the sub-users when creating the sub-users. Such a document collaborating method is different from conventional contacts and conventional collaborative group. It is easy for the one skilled in the art to understand that a relationship between the mother user and the sub-users inherits features of the conventional contacts and the conventional collaborative group and suits the enterprises and government agencies better because of distinctly displaying an organizational structure and user permissions.

According to a twelfth preferred embodiment which is exemplary only and not intended to be limiting, when the shared document is in the document collaborating mode, the document collaborating method further comprises a signing step of, when the document is shared, the user who receives the shared document signing the shared document via marking a status of the document or a digital signature. Obviously, the twelfth preferred embodiment aims at introducing a signing mechanism into the document collaborating for facilitating managing and tracking the documents.

According to a thirteenth preferred embodiment which is exemplary only and not intended to be limiting, when the shared document is in the document collaborating mode, the document collaborating method further comprises sending chat information containing texts or audio to one or more of the online collaborating users. Obviously, the thirteenth preferred embodiment aims at improving collaboration via chatting during the document collaborating.

According to a fourteenth preferred embodiment which is exemplary only and not intended to be limiting, the documents are generated after being uploaded by the user or generated via online editing of the user. Obviously, the fourteen preferred embodiment shows resources of the documents comprising common document generating manners.

According to a fifteenth preferred embodiment which is exemplary only and not intended to be limiting, when the user chooses browsing the document online, an online browsing application is invoked for displaying the document content. Obviously, the fifteenth preferred embodiment aims at making better use of the document. According to the prior arts, many technologies of online document browsing already exist. For example, Google mainly depends on HTML standard to realize online viewing available files; besides, more internet mailbox service providers offer technologies of online browsing mail attachments with respectively different features. Since the purpose of the present invention is not to provide any new application or new method for online browsing, the online browsing technology is as illustrated in the prior arts without repeating herein.

According to a sixteenth preferred embodiment which is exemplary only and not intended to be limiting, the document collaborating method further comprises each sharing user checking difference among the multiple versions of the shared document by comparing files or snapshots of the multiple versions. Obviously, the sixteenth preferred embodiment aims at facilitating the comparison among different versions. The comparison can be realized by directly comparing the documents, wherein multiple document comparison technologies exist in the prior arts and many of the multiple document comparison technologies are already converted into software like diff doc and ultraedit; besides, Microsoft Office already has a simple function of document comparing. The comparison can also be realized by the conventional snapshots, wherein obviously the snapshot technology accomplishes comparing non-text documents and is applied by much picture software and many search engines. As a result, visual comparison is realized, so as to avoid only depending on repeatedly communicating among the users. Since the purpose of the present invention is not to provide any new document comparing technology or new snapshot technology and the snapshot technology according to the prior arts is able to be used in the comparison of the snapshots without inventive improvements, the document comparing and snapshot technologies are as illustrated in the prior arts without repeating herein.

According to a seventeenth preferred embodiment which is exemplary only and not intended to be limiting, the other invited users are non-registered users, which is obviously and similarly mentioned above. The seventeenth preferred embodiment simplifies the establishment of the collaborative group, avoids the problem that the collaborative group of the user only adds the contacts of the user and simplifies a procedure for an outsider to become one of the users after the outsider receives invitation. According to the prior arts, many techniques of adding an additional user into a forum or a website via sending an invitation code to the additional user are disclosed. Since the purpose of the present invention is not to provide any new technology of inviting the outsiders, the technology of inviting the outsides is as illustrated in the prior art without repeating herein.

According to an eighteenth preferred embodiment which is exemplary only and not intended to be limiting, if the invited user is out of the contacts of the user who sends the invitation, the invited user and the user who sends the invitation are mutually added into the respective contacts once the invited user accepts the invitation. Obviously, the eighteenth preferred embodiment aims at facilitating establishing the collaborative group and synchronizing the contacts.

According to a nineteenth preferred embodiment which is exemplary only and not intended to be limiting, once the shared document is signed by the designated user, the message account of the designated user automatically sends a notification of signing to the user who shares the shared document. Obviously, the nineteenth preferred embodiment aims at accomplishing tracking the shared document.

According to a twentieth preferred embodiment which is exemplary only and not intended to be limiting, when the document is a compressed document, the online browsing application firstly invokes an online decompressing application, obtains the decompressed document and then displays the document content. Obviously, the twentieth preferred embodiment aims at browsing content of the compressed document. According to the prior arts, functions of compressing and decompressing the attachments are already provided, especially by the internet mailbox service providers, wherein the function of compressing the attachment is mostly for downloading the attachment and the function of decompressing the attachment is mostly for the user online previewing the attachment. Depending on a strong computing capacity of the server, usually the online compressing and decompressing application has faster speeds of compressing and decompressing than a local compressing and decompressing application.

According to a twenty-first preferred embodiment which is exemplary only and not intended to be limiting, when the document contains dynamic pictures, videos or audios, after the online browsing application is invoked, the dynamic pictures, the videos or the audios in the document are outputted via HTML5 code; and the texts, static pictures and tables are outputted via PDF or static pages. Obviously, the HTML5 code becomes prominent along with a new generation of browsers including OPERA, FIREFOX, SAFARI, CHROME and Internet Explorer 8+, while the Flash technology encounters a strong opponent. An important feature of the HTML5 code is to directly create and run the audios, the videos and the dynamic pictures. It is easy for the one skilled in the art to understand that the twenty-first preferred embodiment exactly corresponds to respective features of the HTML5, the PDF and the static pages. The prior arts have disclosed various HTML5 technologies for outputting the dynamic pictures, the videos and the audios and various PDF or static pages for outputting texts, static pictures and tables. For example, YOUTUBE website starts an overall transition to the HTML5 and multimedia pages of the YOUTUBE website can be browsed by the conventional flash technology and by the HTML5 technology, which is similar to other online pictures or video service providers. Since the purpose of the present invention is not to provide any new outputting technologies of the HTML5, the PDF and the static pages, the outputting technologies of the HTML5, the PDF and the static pages are as illustrated in the prior art without repeating herein.

According to a twenty-second preferred embodiment which is exemplary only and not intended to be limiting, when the document is an Office document, the online browsing application displays the document content via the online Office browsing application. Obviously, the twenty-second preferred embodiment specially aims for the Office document. The online Office browsing application is disclosed in the prior arts. For example, the internet mail service providers often display via HTML; WPS also provides online Office browsing; and well-known Microsoft provides an online version of Office.

According to a twenty-third preferred embodiment which is exemplary only and not intended to be limiting, when the document is a text document or a document containing static pictures and tables, after the online browsing application is invoked, the texts, the static picture and the tables in the document are outputted via PDF or the static pages. Obviously, the twenty-third preferred embodiment specially aims for the text document and the document containing the static pictures and the table without involving dynamic elements and uses the PDF and the static pages according to the prior arts to output.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A document collaborating method among multiple users, comprising following steps of:
   (a) for each user creating one or more types of message accounts correspondent to a username of the user, wherein each user is able to establish contacts and a collaborative group thereof;
   (b) allocating a document initial version number for one or more documents which the user shares with the contacts or the collaborative group, saving an initial version of the shared document and then setting a correspondent sharing permission and a correspondent sharing time limit;
   (c) after finishing setting the sharing permission and the sharing time limit, automatically sending notification messages to the correspondent contacts or the correspondent collaborative group for readily notifying by the message account; and regularly reminding the sharing users to notice the time limit according to the sharing time limit by the message accounts of all sharing users of the shared document;
   (d) when the shared document is in a document collaborating mode, locking content being edited for each sharing user; when the locked content is being edited, regularly and automatically saving content being locked for each sharing user and allowing each sharing user to manually save the document; and automatically creating an updated version of the document under the user if the automatically saving or the manually saving by the user is finished;
   (e) automatically unlocking the locked content once editing the locked content is finished; and
   (f) when a last user in the document collaborating mode goes offline, saving a last document of the last user as a latest version of the last user and then creating a new version of the document with the latest version of the last user and other latest versions of other sharing users of the document.

2. The document collaborating method among multiple users, as recited in claim 1, wherein the type of the message account is one member selected from a group consisting of an intranet mail account, an intranet instant messenger account, an intra-site short message account, a bound internet mail account, a bound internet instant messenger account, and a bound phone number able to receive short messages or multimedia messages.

3. The document collaborating method among multiple users, as recited in claim 1, wherein an element of the document content comprises positioning information when the document content is displayed to the user.

4. The document collaborating method among multiple users, as recited in claim 1, wherein the notification messages comprise an access address of the shared document and illustration about the sharing permission and the sharing time limit.

5. The document collaborating method among multiple users, as recited in claim 1, further comprising displaying warning information when the shared document is in the document collaborating mode, wherein the warning information indicates that locking the content being edited is done by a specific user.

6. The document collaborating method among multiple users, as recited in claim 1, wherein the locked content is a line or a cell being edited; or the locked content is an inserted formula or inserted multimedia content in the document.

7. The document collaborating method among multiple users, as recited in claim 6, further comprising each sharing user checking difference among multiple versions of the shared document by comparing files or snapshot of the multiple versions.

8. The document collaborating method among multiple users, as recited in claim 1, further comprising highlighting or circling the locked content when the shared document is in the document collaborating mode.

9. The document collaborating method among multiple users, as recited in claim 1, wherein the new version of the shared document is prevented from covering previous versions before the new version; and the updated version of the shared document is prevented from covering the previously updated versions.

10. The document collaborating method among multiple users, as recited in claim 1, the collaborative group comprises the user and other invited users designated by the user.

11. The document collaborating method among multiple users, as recited in claim 10, wherein if the invited user is out of the contacts of the user who sends the invitation, the invited user and the user who invites are mutually added into the respective contacts once the invited user accepts the invitation.

12. The document collaborating method among multiple users, as recited in claim 1, wherein at least one sub-user is created for the user; a document list of the sub-user comprises the documents or folders which are designated by the user; and the user sets an access permission, an access password, or an access time limit of the designated documents or the designated folders.

13. The document collaborating method among multiple users, as recited in claim 1, further comprising, when the document is shared, the user who receives the shared document signing the shared document via marking a status of the shared document or a digital signature.

14. The document collaborating method among multiple users, as recited in claim 13, wherein once the shared document is signed by the designated user, the message account of the designated user automatically sends a notification of signing to the user who distributes the shared document.

15. The document collaborating method among multiple users, as recited in claim 1, further comprising sending chat information containing texts or audios to at least one of online collaborating users, when the shared document is in the document collaborating mode.

16. The document collaborating method among multiple users, as recited in claim 1, wherein the document is generated by being uploaded by the user or by online editing of the user.

17. The document collaborating method among multiple users, as recited in claim 1, wherein an online browsing application is invoked for displaying the document content when the user chooses to browse the document online.

18. The document collaborating method among multiple users, as recited in claim 17, wherein
when the document is a compressed document, the online browsing application firstly invokes an online decompressing application, obtains the decompressed document and then displays the document content;
when the document contains dynamic pictures, videos or audios, after the online browsing application is invoked, the dynamic pictures, the videos or the audios in the document are outputted via HTML5 code, and texts, static pictures and tables in the document are outputted via PDF or static pages;
when the document is an Office document, the online browsing application display the document content via an online Office browsing application; and
when the document is a text document or a document containing the static pictures or the tables, after the online browsing application is invoked, the texts, the static pictures or the tables in the document are outputted via the PDF or the static pages.

* * * * *